US009121199B2

(12) United States Patent
Li

(10) Patent No.: US 9,121,199 B2
(45) Date of Patent: Sep. 1, 2015

(54) ELECTRONIC COMBINATION LOCK

(75) Inventor: Hui Hong Jim Kery Li, Singapore (SG)

(73) Assignee: DigiPas USA, LLC, Avon, CT (US)

( * ) Notice: Subject to any disclaimer, the term of this patent is extended or adjusted under 35 U.S.C. 154(b) by 28 days.

(21) Appl. No.: 13/698,458

(22) PCT Filed: May 25, 2010

(86) PCT No.: PCT/SG2010/000194

§ 371 (c)(1), (2), (4) Date: Nov. 16, 2012

(87) PCT Pub. No.: WO2011/149424

PCT Pub. Date: Dec. 1, 2011

(65) Prior Publication Data

US 2013/0055773 A1 Mar. 7, 2013

(51) Int. Cl.

| | |
|---|---|
| ***G05B 19/00*** | (2006.01) |
| ***E05B 67/00*** | (2006.01) |
| ***E05B 47/06*** | (2006.01) |
| ***G07C 9/00*** | (2006.01) |
| *E05B 15/00* | (2006.01) |
| *E05B 47/00* | (2006.01) |

(52) U.S. Cl.

CPC ................. *E05B 67/00* (2013.01); *E05B 47/06* (2013.01); *G07C 9/0069* (2013.01); *E05B 15/006* (2013.01); *E05B 47/0012* (2013.01); *E05B 2047/0016* (2013.01); *E05B 2047/0065* (2013.01); *E05B 2047/0094* (2013.01); *G07C 2009/00634* (2013.01); *G07C 2009/00793* (2013.01); *Y10T 70/7068* (2015.04)

(58) Field of Classification Search

CPC ..... E05B 49/00; E05B 19/0008; E05B 41/00; E05B 17/226; G07C 9/00174

USPC .................................................. 340/5.1, 5.64

See application file for complete search history.

(56) References Cited

U.S. PATENT DOCUMENTS

| | | | | |
|---|---|---|---|---|
| 4,426,862 | A * | 1/1984 | Yamada et al. | 70/69 |
| 4,896,246 | A * | 1/1990 | Henderson et al. | 361/171 |
| 5,522,243 | A * | 6/1996 | Kusmiss | 70/330 |
| 6,337,618 | B1 | 1/2002 | Craig et al. | |
| 2002/0070879 | A1 * | 6/2002 | Gazit et al. | 340/901 |
| 2002/0078445 | A1 * | 6/2002 | Sharif et al. | 725/37 |
| 2006/0283216 | A1 * | 12/2006 | Marcelle et al. | 70/38 A |

(Continued)

FOREIGN PATENT DOCUMENTS

| | | |
|---|---|---|
| GB | 2409317 | 6/2005 |
| WO | 2006130660 | 12/2006 |

OTHER PUBLICATIONS

International Preliminary Report on Patentability issued in International Application No. PCT/SG2010/000194, dated Jun. 29, 2012.

*Primary Examiner* — Steven Lim
*Assistant Examiner* — Omeed Alizada
(74) *Attorney, Agent, or Firm* — McCormick, Paulding & Huber LLP

(57) ABSTRACT

Disclosed herein is an electronic combination lock mainly characterized by miniature size and easy-to-use electronic identification access-gaining method that enables a vast variety and type of access codes for user setting and choice. Another battery operated electronic key unit, incorporated with programmed access code to provide as an alternative choice for locking, unlocking and backup power, can be used in conjunction with the electronic combination lock.

20 Claims, 7 Drawing Sheets

(56) References Cited

U.S. PATENT DOCUMENTS

| | | | | |
|---|---|---|---|---|
| 2007/0090921 | A1 * | 4/2007 | Fisher | 340/5.73 |
| 2007/0236341 | A1 | 10/2007 | Mackjust et al. | |
| 2009/0226050 | A1 | 9/2009 | Hughes | |
| 2009/0282876 | A1 * | 11/2009 | Zuraski et al. | 70/35 |
| 2010/0283579 | A1 * | 11/2010 | Kraus et al. | 340/5.7 |

* cited by examiner

ELECTRONIC COMBINATION LOCK

BACKGROUND OF THE INVENTION

Typical conventional locking devices, such as padlocks and luggage locks, require user to manually enter a sequence of numbers by adjusting multi-rotating dials inscribed with numeric digits to open a lock. This type of locking devices is commonly known as Combination Locks and they usually do not require a mechanical key. Instead users need to preset a combination digit code and remember this code when unlocking such locks. In contrast, existing electronic locks are usually designed with a bulky and relatively large numeric keypad for entering access codes. These keypads are not suitable for used in small size electronic combination locks.

The invention is concerned with small size electronic combination locks. In particular, the invention relates to miniaturization and an easy-to-use electronic identification method for setting locking and unlocking combination access code of electronic combination locks such as padlocks, chain locks, luggage locks, wire locks and bicycle locks.

The method of adjusting mechanical combination codes to unlock conventional locking devices is cumbersome and time consuming. The problems of using such combination locks are as follows: (1) reading and adjusting small size of inscribed digits on the rotating dials become tedious and time consuming (2) limited numeric digits from 0 to 9 resulted little choices of access code that can be formed by user (3) memorizing multiple numeric digits of access codes can be difficult to some users.

In addition to above shortcomings of conventional combination locks, there has been a need for a small electronic lock operated by an electronic identification device with characteristics as follows: easy to use due to its simplicity, increased variety of choices of combination codes, very low battery power consumption, and relatively inexpensive construction.

U.S. Pat. No. 4,495,540, describes an electronic combination lock for luggage. The electronic combination lock described in this patent comprises several buttons which emulate the mechanical adjustable rings in conventional combination locks. It is a replicate of multi-digit mechanical adjustable rings to several electronic push buttons. These multiple buttons method of entering access code is not suitable for application in small electronic combination locks. The patent is incorporated here for reference.

The followings additional patents are believed to have relevance to the invention: U.S. Pat. Nos. 3,754,164, 4,931,789, 5,021,776, 5,153,561, 5,373,718, To address the weaknesses and the needs described above, the inventor proposed an alternative electronic combination lock which provides the public with a useful choice.

SUMMARY OF INVENTION

The invention provides an electronic combination lock comprising an electronic system unit, a mechanical housing, a miniaturized latch and a set of switches or sensor to manually and automatically turn on/off the electronic system. The electronic system consist of a visual display unit, a small Joystick switch or a set of switches or a touch sensor or a plurality of optical sensor, to provide a means of entering and setting access code, a microcontroller programmed with software in combination with electronic circuitry to drive a miniaturized toggle solenoid or a micro motor to perform locking and unlocking functions. The compact electronic system unit fit to the mechanical housing to form a unitary embodiment of electronic locking device.

Using a set of mechanical switches or a sensor and software protocol, an automatic device "waking-up" method is derived to prevent unnecessary turning on its electronic system when not in used to conserve battery power. The electronic system is normally programmed to automatically power off and can be manually turned off using a press button. The electronic system can be activated by the following actions: 1). manually press an on/off button, 2). automatically triggered by a displacement sensor (e.g. acceleration sensor, vibration sensor, movement sensor) when an appropriate movement or combination of movements of the lock detected.

The combination of electronic display, a 5-way switch Joystick or a touch sensor and the software in conjunction with an electronic controller, enable a vast variety and choices of access codes are constructed by an user. Access codes can be stored in memory of the electronic system. Alphanumeric characters, colors graphics, shapes, symbols, patterns and other language characters, and their combinations to form words, names, and others combination to produce a vast variety of high security access codes that are meaningful, user-friendly, and easy for user to remember. More than one access code can be set to enable several users to use one electronic combination lock with different access code set for the convenient of each particular user.

When using a touch sensor for access code entry, user can touch and scroll to search for the alphanumeric characters or patterns displayed on screen and click the choice for performing access code entry actions. The display unit (e.g. LCD display) can be illuminated to ease reading of access code in a less illuminated environment.

A separate battery operated electronic key unit, which contents a programmed access code and electronic circuitry, can be used in conjunction with the electronic combination lock. The electronic key can serve as: (1) a proximity controller to perform locking and unlocking actions (2) an alternative power source to boot up the electronic combination lock with a flatten battery. (3) Backup access code storage.

The invention thus provides a miniature, compact, easy for entering/setting vast choices of access code, user-friendly locking and unlocking features, low power consumption, easy to use electronic combination lock and can advantageously replace the use of conventional combination locks. These and other objects, advantages and features of the invention will be apparent from the following description of a preferred embodiment, considered along with the accompanying drawings.

BRIEF DESCRIPTION OF THE DRAWINGS

The details of the electronic combination lock and electronic key will be understood more clearly with reference made to the accompanying drawings, in which.

DESCRIPTION OF PREFERRED EMBODIMENTS

Figure 1:
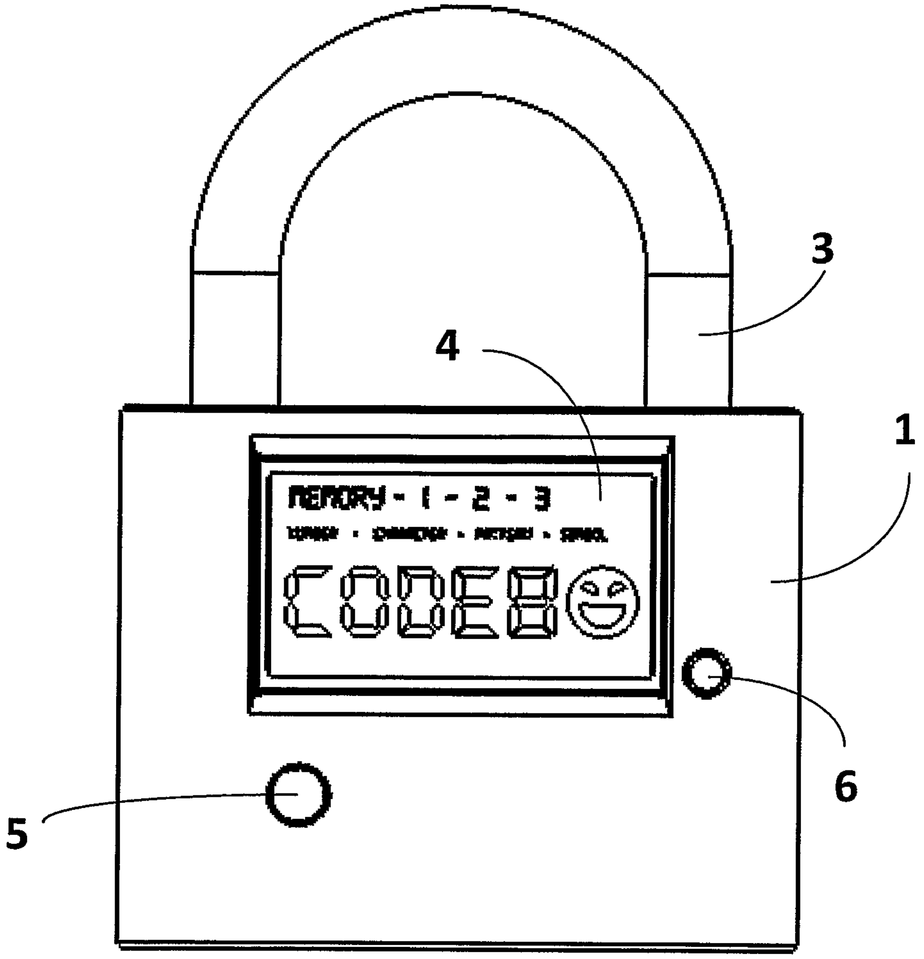
FIG. 1 is a front elevational view of one embodiment of the digital combination lock of the present invention.
Figure 2:
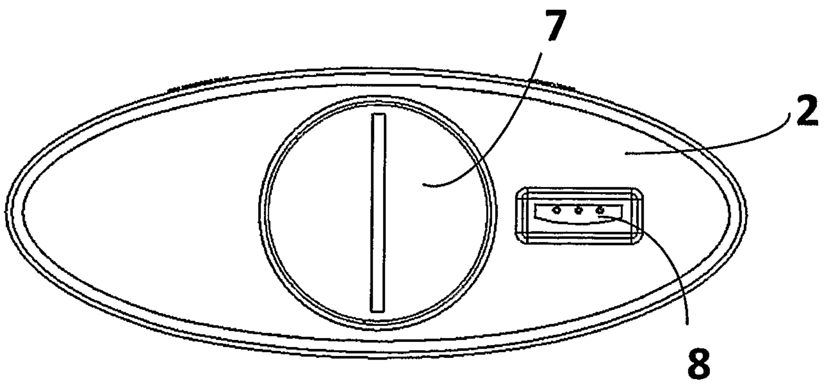
FIG. 2 is a bottom elevational view of the present invention showing a battery compartment and a key way.

An embodiment of an electronic combination padlock can best be appreciated by referring to FIGS. 1 and 2. The electronic combination lock having a mixture of metal and plastic material to form a housing structure 1, preferably elongated, consists of metal plates 2 on the top and bottom of the housing 1 to reinforce the structure. The lock has a shackle-type locking bar 3 that is held lock in position within the housing 1. The front side of the housing 1 has a back-lighted touch screen Liquid Crystal Display (LCD) 4 either by color pixels or dot matrix which is capable of displaying combination of alphanumeric characters, symbols and patterns. It will be appreciated that LCD screen 4 includes both a touch sensor and an electronic display unit. The touch feature on the LCD screen 4 allows entering and controlling locking features. The LCD screen 4 is automatically turned off within a short duration to conserve battery power. In this preferred form described herein, the electronic combination lock uses six "digital dials" access code (a smaller or larger number of dials can also be used). An On/Off push button 5 is situated below the LCD screen 4 to turn on or off the lock electronic system. Alternative method of turning On the device is achieved by shaking the lock which will trigger the movement sensor 16 and thus activating the electronic system of the electronic combination lock 17. A receiver 6 for an infrared or radio frequency receiver system is situated to the right of the LCD screen 4 to receive signal from the electronic key for performing locking and unlocking functions. The bottom of the housing 9 is the battery compartment which is enclosed by the battery cap 7. It permits two batteries 10 to be contained in the compartment. To the right of the battery cap 7 is the key hole 8 for the electronic key to be inserted in to unlock the electronic combination lock as an alternative method. When the electronic combination lock battery 10 has drained off completely, the battery source 22 from the electronic key can be used to power up the electronic combination lock. In an example embodiment, both the status of the electronic combination lock and a preprogrammed access code remain in an initial state as store din a memory for the electronic system regardless of whether battery 10 is being removed or is completely discharged.

Figure 3:
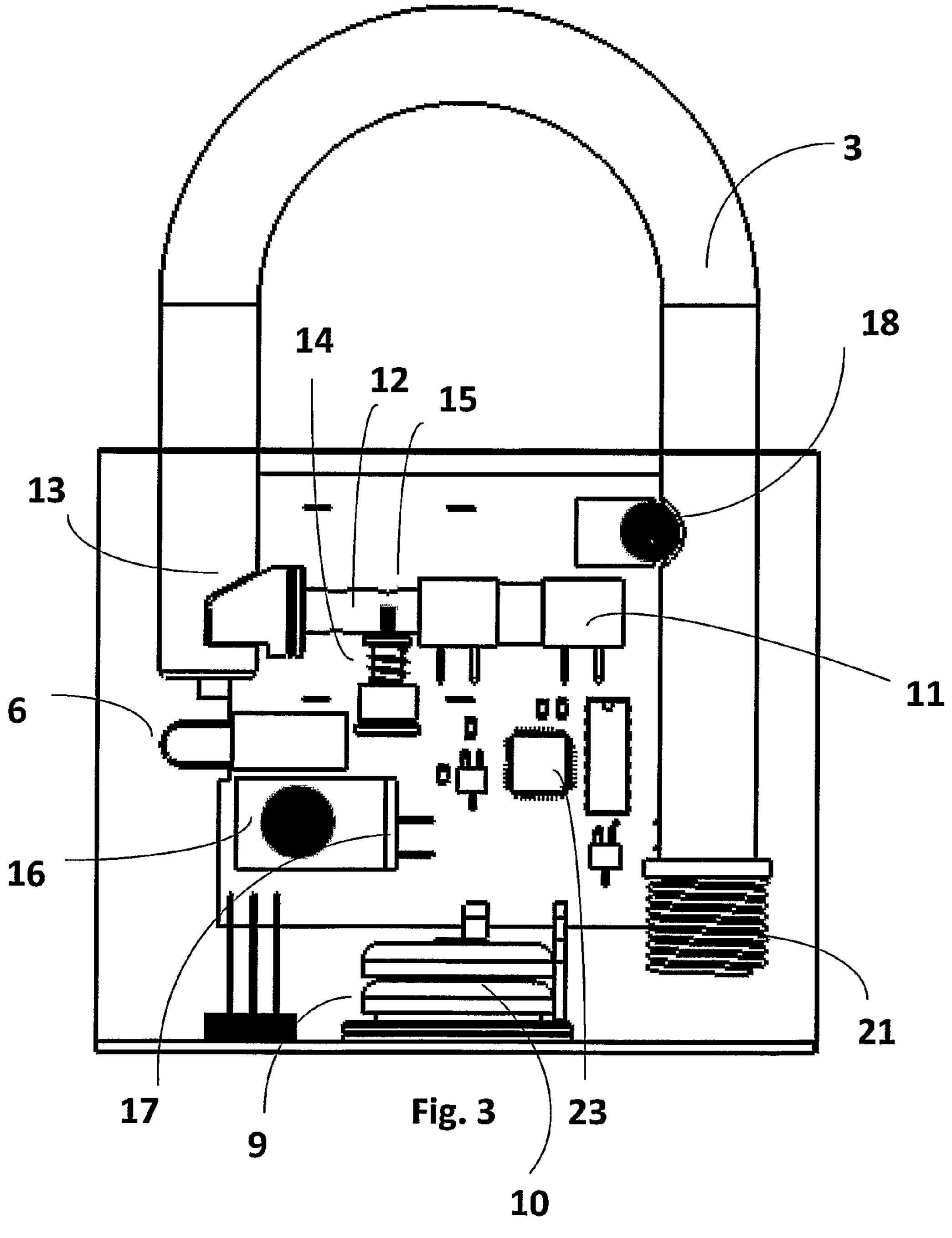
FIG. 3 is a back elevational view of the interior of the digital combination lock in closed position showing a solenoid locking into the shackle bar.
Figure 4:
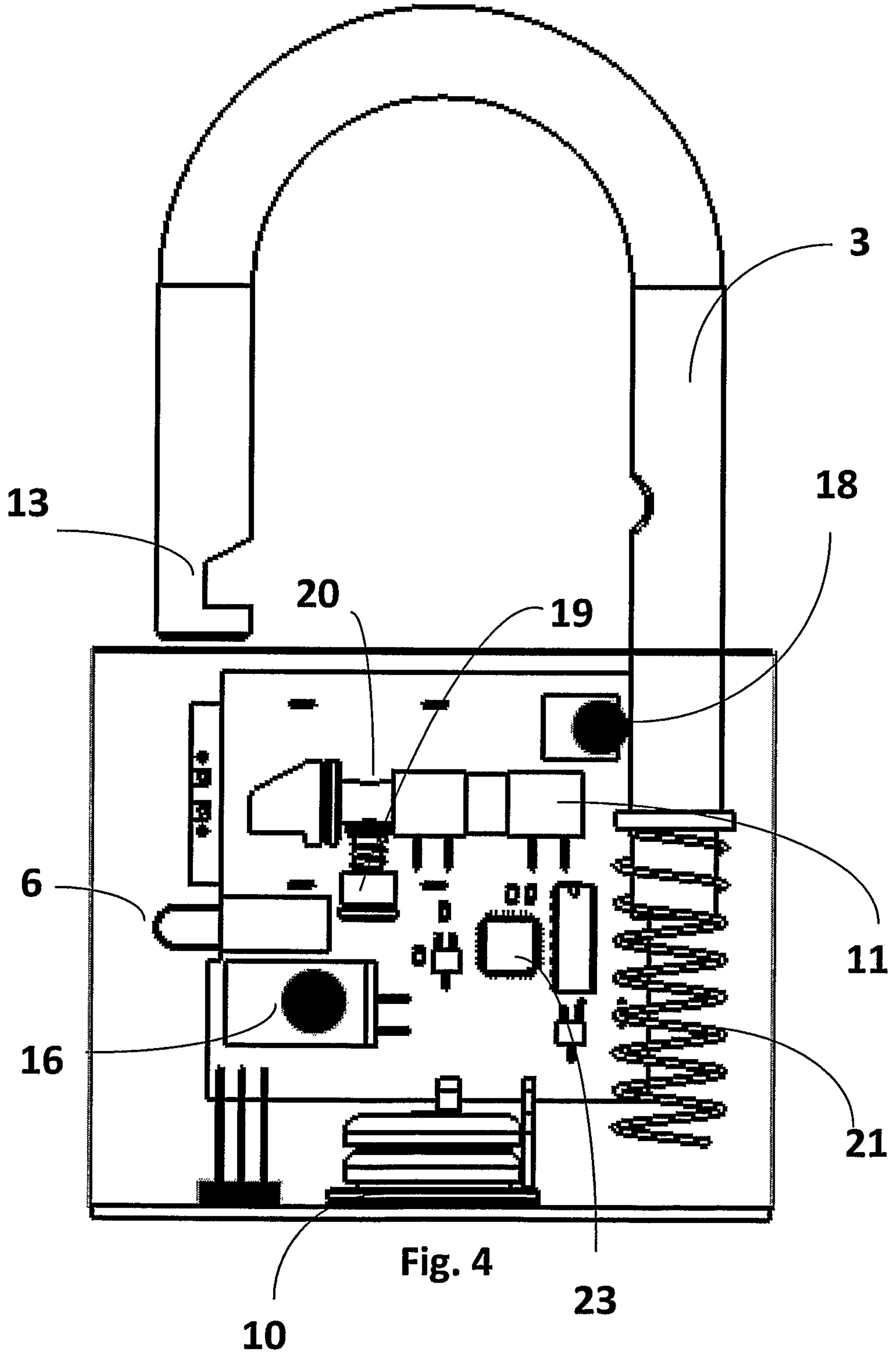
FIG. 4 is a back elevational view of the interior of the digital combination lock in opened position showing a solenoid releasing from the shackle bar.
Figure 5:
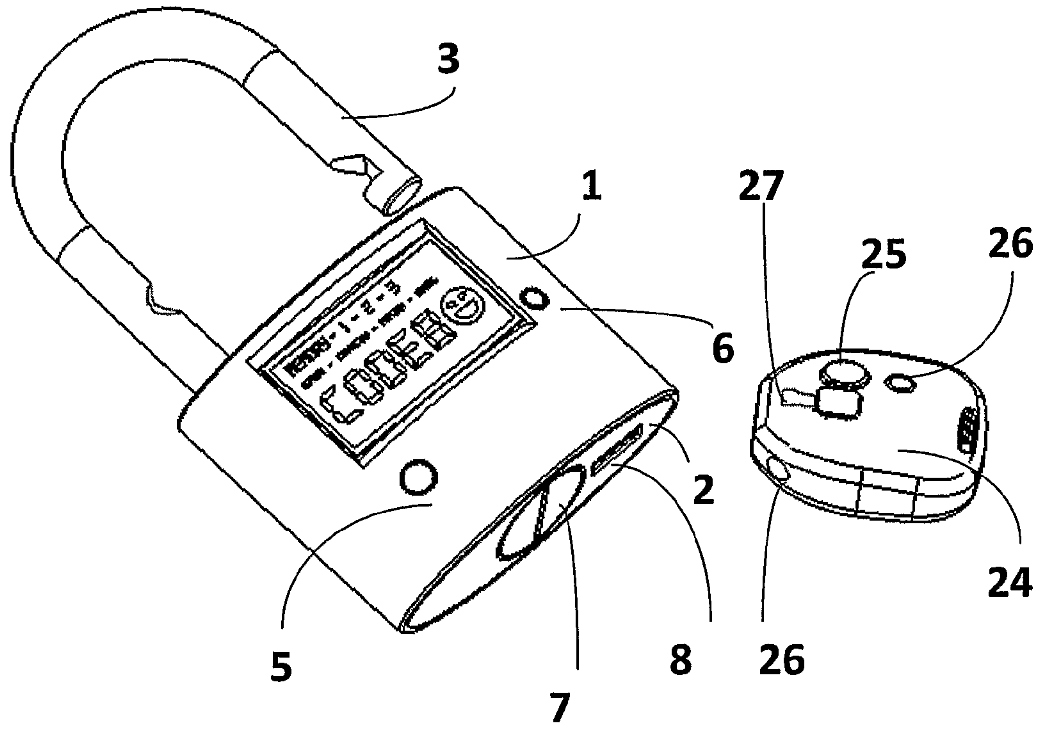
FIG. 5 is a front perspective view of the overall view showing a touch screen as the controller for the input of access codes into the invention.

Referring to FIGS. 3 and 4, the inner section of the housing 1 is preferably made from metal and the components are secured to the housing. The shackled bar 3 is held within the inner section by a solenoid 11 actuated bar 12 or a miniature motor. The shackled bar 3 is spring loaded 21 at one end. The shackle bar 3 is held by a actuated bar 12 secured into the groove 13 of the shackle bar 3.

When an access code is entered by user to perform locking action, a signal is sent to the microcontroller 23 held on the circuit board, it drives the solenoid 11. The solenoid 11 will in turn actuate the actuated bar 12 to move forward. Upon actuation, actuated bar 12 will move into the groove 13 of the shackle bar 3 thereafter a second spring loaded bar 14 will move into the hole 15 of the actuated bar 12. The spring bar 14 acted as safety barrier to prevent the actuated bar 12 from unintentionally release from the latched position. A spring load ball bearing 18 is used to assist holding the shackle bar 3 in position for the actuated bar 12 to insert in and move out to accommodate latching and unlatching actions.

When an access code is entered on the electronic combination lock or a pre-programmed electronic key with access code is inserted into connector 8, a signal is sent to the microcontroller 23 to release the shackle bar to trigger the toggle solenoid 19 which in turn retracts the bar 14. Upon retraction, solenoid 11 will actuate to move the actuated bar 12 backward. Shackle bar 3 will spring out of the holding position into unlock position. After a certain duration solenoid 19 will release bar 14 into latching hole 20 to keep the actuated bar 12 from moving during unlocking state.

Figure 6:
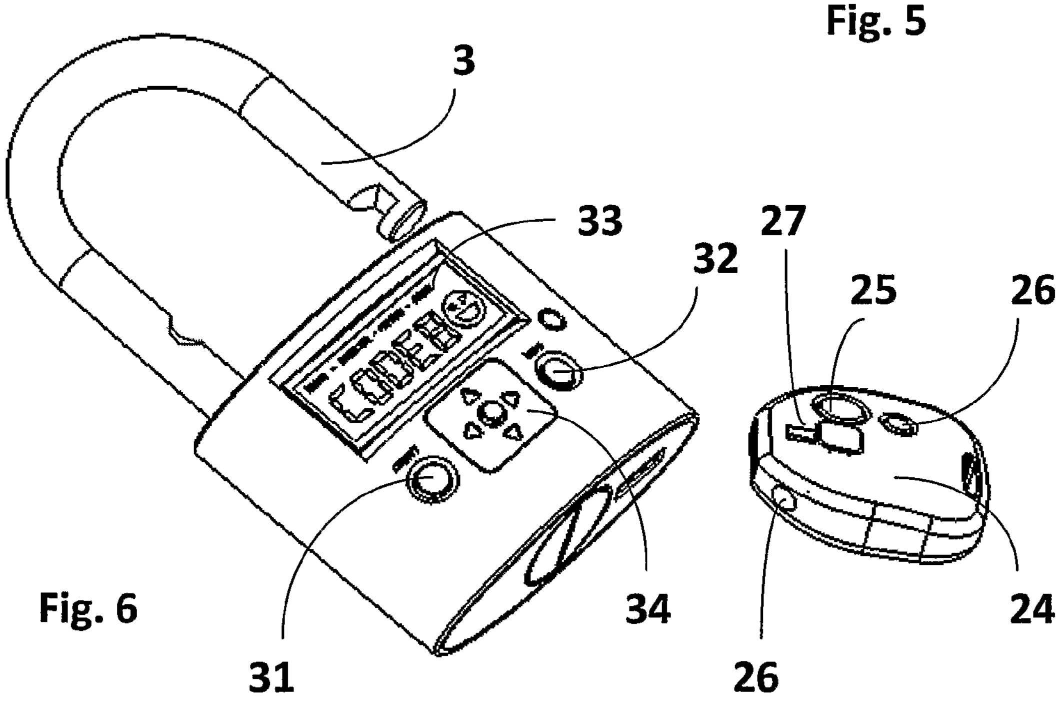
FIG. 6 is a front perspective view of the overall view showing a joystick as the controller for input of access code into invention.

Referring to FIG. 6, it shows another preferred embodiment using the joystick mechanism 34 as the input device. Access code 33 displayed on LCD screen can be in the forms of alphanumeric characters, symbols and patterns. On the right of the joystick mechanism is the mode button 32 to select a particular feature required. On the left is the On/Off button 31 to power On or Off the electronic system within the electronic combination lock.

Figure 7:
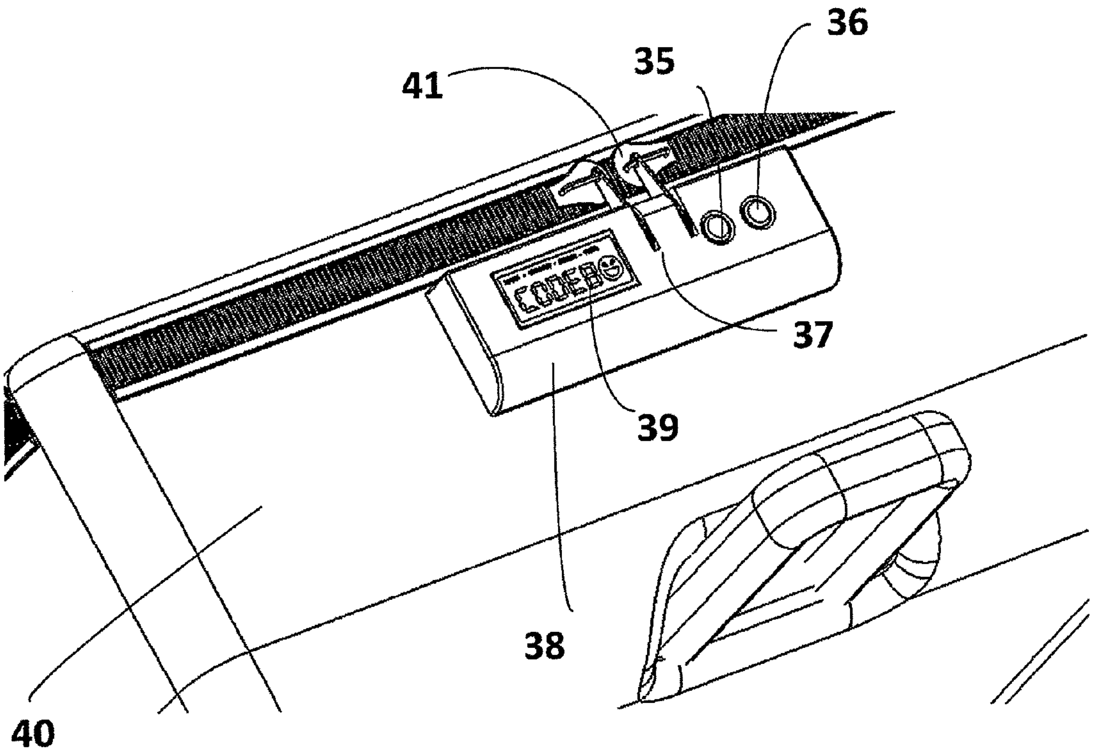
FIG. 7 is the front perspective view of the overall view showing the electronic combination lock embedded on a luggage bag.

FIG. 7 illustrates another preferred embodiment of the electronic combination lock embedded in a luggage bag 40. The pull tabs 41 of the luggage are to be inserted into the metal hooks 37 of the mechanical housing 38. Numerical 35 is the mode button to select a specific feature of the electronic luggage lock. On the right side of the mode button 35 is the On/Off button 36 to power on or off the electronic system. A LCD screen 39 is available for displaying access code and other features such as displaying lock status, wrong access code, selected type of code etc.

Figure 8:
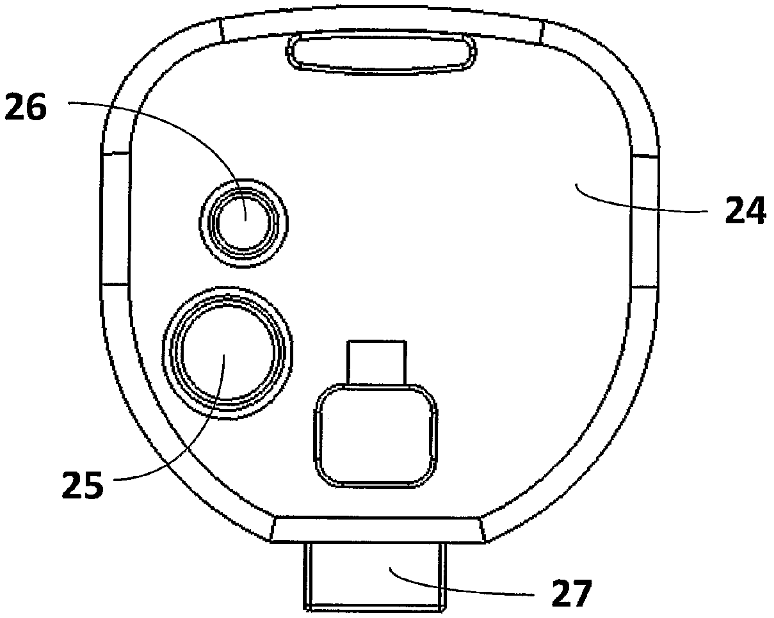
FIG. 8 is a top elevational of the electronic key showing a button extended the contact point out of the casing.
Figure 9:
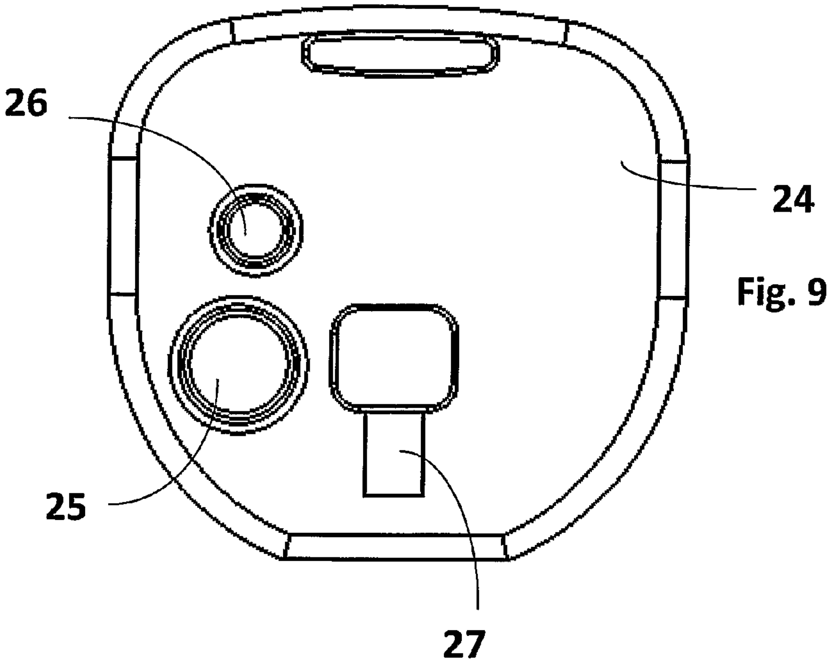
FIG. 9 is a top elevational of the electronic key showing the contact retracted into the casing.
Figure 10:
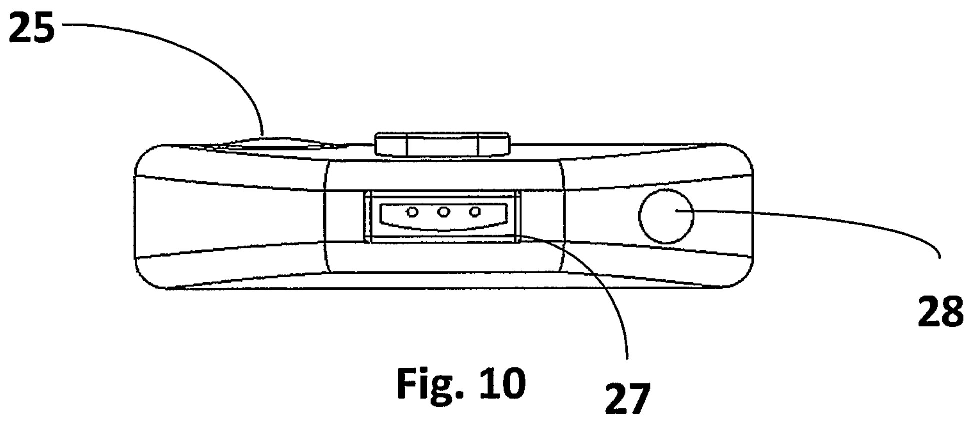
FIG. 10 is a front elevational of the electronic key showing the contact and infra red.
Figure 11:
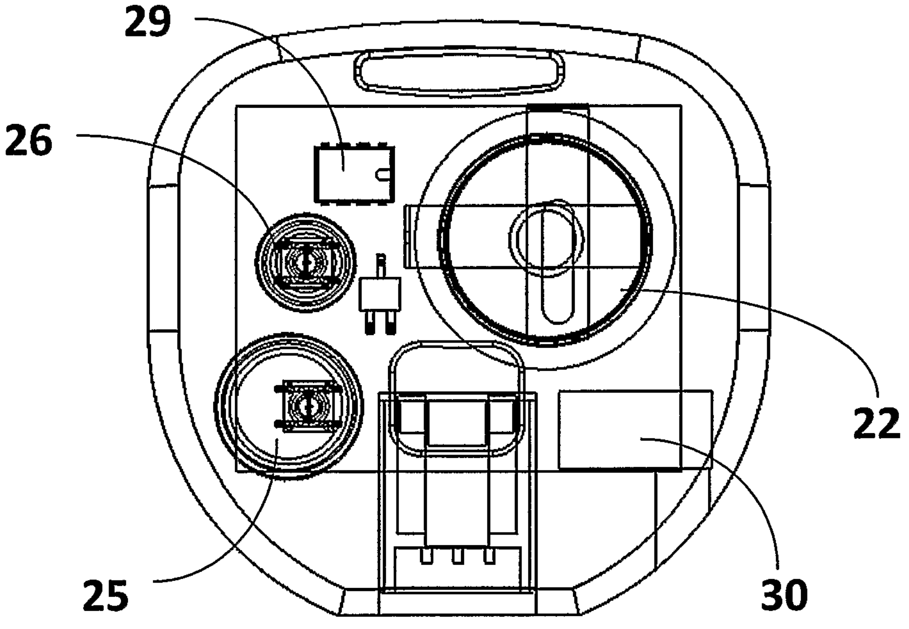
FIG. 11 is a top elevational of the electronic key showing the interior of the lock with all the components

Referring to FIG. 8 to 10, the electronic key module comprises a plastic housing 24, unlock push buttons 25, lock push button a retractable connector 27 and infra red transmitter 28. The electronic key has two ways to open the electronic combination lock. Referring to FIG. 7, connector 27 is pushed out and inserted into the key hole 8 of the housing. The pre-programmed unlocking access code for the electronic lock is stored in memory of the integrated circuit 29. Upon insertion into the key hole 8, it sends a signal to the microcontroller 23 once the access code validated, the unlocking sequences is activated. This method of unlocking the electronic combination lock can be performed regardless the presence of battery source 10. Alternative method of unlocking the electronic combination lock is to use the infra red transmitter 30. Within a proximity range of the circuit, with a press on the unlock button 26, a signal from the transmitter 30 sends to the receiver of the electronic combination lock 6 which then triggers the microcontroller to perform locking and unlocking sequences.

What is claimed is:

1. A miniature electronic lock comprising:

a housing that includes a battery compartment;

a shackle bar that fits into the housing;

a movement sensor that is an acceleration or vibration sensor disposed within the housing and configured to detect a pattern of shaking of the miniature electronic lock; and an electronic system, protected by the housing, that includes memory storing a preprogrammed access code and that uses a microcontroller programmed by software to release the shackle bar upon the preprogrammed access code being received from a touch sensor and electronic display unit or from an electronic key, wherein the electronic system receives power from one or more batteries in the battery compartment, wherein the displacement sensor provides power saving activation for the electronic system by activating the electronic system in response to the detected pattern of shaking of the lock, and wherein the preprogrammed access code includes at least one shape and at least one color graphic.

2. A miniature electronic lock as in claim 1, wherein the touch sensor and electronic display unit is a touch-screen liquid crystal display (LCD) that is turned off automatically by the electronic system after a short duration.

3. A miniature electronic lock as in claim 1, wherein the touch sensor is a touch panel or a track-pad.

4. A miniature electronic lock as in claim 1, wherein both a status of the miniature electronic combination lock and the preprogrammed access code remain in an initial state as stored in a memory for the electronic system regardless of whether the one or more batteries in the battery compartment are being removed or are completely discharged.

5. A miniature electronic lock as in claim 1, wherein the electronic key serves as a proximity controller for the electronic system.

6. A miniature electronic lock as in claim 1, further comprising a radio frequency receiver system to enable proximity access by the electronic key for input of the preprogrammed access code.

7. A miniature electronic lock as in claim 1, wherein the electronic key includes a connector and the preprogrammed access code is read by the electronic system when the connector is inserted in a key hole in the housing that is configured to receive the connector.

8. A miniature electronic lock as in claim 1, wherein the electronic key includes at least one battery and electronic circuitry to provide power to the electronic system.

9. A miniature electronic lock comprising:

a housing that includes a battery compartment;

a shackle bar that fits into the housing;

a movement sensor that is an acceleration or vibration sensor disposed within the housing and configured to detect a pattern of shaking of the miniature electronic lock;

a touch sensor and electronic display unit;

a key hole in the housing that is configured to receive an electronic key;

a radio frequency receiver system to enable proximity access by the electronic key; and an electronic system, protected by the housing, that includes memory storing a preprogrammed access code and that uses a microcontroller programmed by software to release the shackle bar upon the preprogrammed access code being received as input from either the touch sensor and electronic display or the electronic key, wherein the preprogrammed access code includes at least one shape and one color graphic, and wherein the displacement sensor provides power saving activation for the electronic system by activating the electronic system in response to the detected pattern of shaking of the lock.

10. A miniature electronic lock as in claim 9, wherein the touch sensor and electronic display unit is a touch-screen liquid crystal display (LCD) that is turned off automatically by the electronic system after a short duration.

11. A miniature electronic lock as in claim 9, wherein the touch sensor is a touch panel or a track-pad.

12. A miniature electronic lock as in claim 9, wherein both a status of the miniature electronic combination lock and the preprogrammed access code remain in an initial state as stored in a memory for the electronic system regardless of whether the one or more batteries in the battery compartment are being removed or are completely discharged.

13. A miniature electronic lock as in claim 9, wherein the electronic key serves as a proximity controller for the electronic system.

14. A miniature electronic lock as in claim 9, wherein the electronic key includes a connector and the preprogrammed access code is read by the electronic system when the connector is inserted in the key hole.

15. A miniature electronic lock as in claim 9, wherein the electronic key includes at least one battery and electronic circuitry to provide power to the electronic system.

16. A miniature electronic lock as in claim 9, wherein the electronic key uses proximity access for input of the preprogrammed access code.

17. A miniature electronic lock comprising:

a housing that includes a battery compartment;

a shackle bar that fits into the housing;

a movement sensor that is an acceleration or vibration sensor disposed within the housing and configured to detect a pattern of shaking of the miniature electronic lock;

a radio frequency receiver system to enable proximity access by an electronic key; and an electronic system, protected by the housing, that includes memory storing a preprogrammed access code and that uses a microcontroller programmed by software to release the shackle bar upon the preprogrammed access code being received as input from the electronic key, wherein the electronic system receives power from one or more batteries in the battery compartment, wherein the displacement sensor provides power saving activation for the electronic system by activating the electronic system in response to the detected pattern of shaking of the lock, wherein the electronic key includes at least one battery and electronic circuitry to provide power to the electronic system, and wherein the preprogrammed access code includes at least one shape and one color graphic.

18. An electronic lock as in claim 17, wherein the electronic key includes a connector and the preprogrammed access code is read by the electronic system when the connector is inserted in a key hole in the housing.

19. A miniature electronic lock as in claim 17, wherein the electronic key uses proximity access for input of the preprogrammed access code.

20. A miniature electronic lock as in claim 17, wherein the electronic key serves as a proximity controller for the electronic system.

* * * * *